United States Patent
Sakamoto et al.

(10) Patent No.: US 6,614,512 B1
(45) Date of Patent: Sep. 2, 2003

(54) SYSTEM FOR MEASURING WAVELENGTH DISPERSION OF OPTICAL FIBER

(75) Inventors: Takashi Sakamoto, Atsugi (JP); Yuichiro Moroto, Machida (JP); Junkichi Shirono, Sagamihara (JP)

(73) Assignee: Anritsu Corporation, Tokyo (JP)

( * ) Notice: Subject to any disclaimer, the term of this patent is extended or adjusted under 35 U.S.C. 154(b) by 0 days.

(21) Appl. No.: 09/830,211

(22) PCT Filed: Sep. 6, 2000

(86) PCT No.: PCT/JP00/06024
§ 371 (c)(1),
(2), (4) Date: Apr. 23, 2001

(87) PCT Pub. No.: WO01/18521
PCT Pub. Date: Mar. 15, 2001

(30) Foreign Application Priority Data

Sep. 6, 1999 (JP) ............................................. 11-251895

(51) Int. Cl.⁷ ............................................... G01N 21/00
(52) U.S. Cl. ...................................................... 356/73.1
(58) Field of Search ................................ 356/73.1, 364, 356/477, 450, 318, 73, 454, 484, 319; 359/172, 189, 237–239, 264, 130, 337.5, 245, 279, 124, 173; 385/37, 124, 131, 123, 24; 250/214 VT, 458.1

(56) References Cited

U.S. PATENT DOCUMENTS 4,551,019 A * 11/1985 Vella et al. ................. 356/73.1
4,893,006 A * 1/1990 Wakai et al. ............ 250/227.11
5,179,420 A    1/1993 So et al.

FOREIGN PATENT DOCUMENTS

| JP | 62-207927 | 9/1987 |
| JP | 4-285836 | 10/1992 |
| JP | 8-5515 | 1/1996 |
| JP | 08-334436 | * 12/1996 |
| WO | WO 97/46870 A | 11/1997 |

* cited by examiner

*Primary Examiner*—Frank G. Font
*Assistant Examiner*—Tu T. Nguyen
(74) *Attorney, Agent, or Firm*—Frishauf, Holtz, Goodman & Chick, P.C.

(57) ABSTRACT

A branch section transmits optical pulses of a plurality of wavelengths successively emitted from a light source at one end of an optical fiber to be measured, and extracts reflected lights from the optical fiber. A light receiving section detects reflected lights from the branch section and outputs them as measurement data. The processing section calculates a wavelength dispersion value of the optical fiber by detecting a time of emitting the optical pulse of each of the wavelengths from the light source. In a case where the optical fiber is formed of a plurality of optical fibers connected in series by at least one connecting point, the processing section calculates wavelengths dispersion values of the respective optical fibers by detecting the time of emitting the optical pulse, a time of receiving a reflected light from the connecting point and a time of receiving a reflected light from another end of the optical fiber.

16 Claims, 8 Drawing Sheets

SYSTEM FOR MEASURING WAVELENGTH DISPERSION OF OPTICAL FIBER

This application is a U.S. National Phase Application under 35 USC 371 of International Application PCT/JP00/06024 (not published in English) filed Sep. 6, 2000.

TECHNICAL FIELD

The present invention relates to a wavelength dispersion measuring system for measuring wavelength dispersion of optical fibers provided in an optical communication path, and more particularly to a wavelength dispersion measuring system including: a wavelength dispersion measuring apparatus for, in a case where an optical fiber to be measured is formed of a plurality of optical fibers connected in series by at least one connecting point, measuring wavelength dispersion values of the respective optical fibers from an end of the optical fiber to be measured; an optical time domain reflectometer (hereinafter referred to as an OTDR) having such a wavelength dispersion measuring function; such an optical wavelength dispersion measuring method; and a storage medium storing such a wavelength dispersion processing program.

BACKGROUND ART

An optical fiber laid in an optical communication path has a wavelength dispersion characteristic; that is, the reflectivity of light traveling through the optical fiber varies depending on the wavelength.

Since the transmission speed of light within an optical fiber is influenced by the wavelength dispersion characteristic, it is necessary to measure the wavelength dispersion characteristic of the optical fiber.

Figure 11:
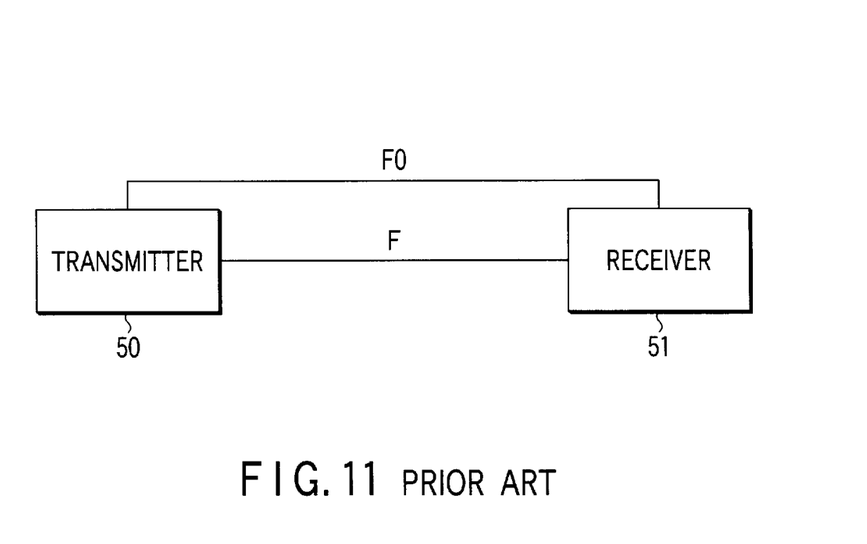
FIG. 11 is a diagram showing the structure for wavelength dispersion measurement according to the conventional art.

FIG. 11 is a diagram showing a state of measurement of a wavelength dispersion characteristic according to the conventional art.

A transmitter 50 and a receiver 51 are respectively arranged at the ends of an optical fiber F laid in an optical communication path.

An optical fiber F0, serving as a reference, is arranged parallel to the optical fiber F to be measured.

The wavelength dispersion characteristic of the optical fiber F is measured by (1) the phase method or (2) the pulse method as will be described below by means of the transmitter 50 and the receiver 51. (1) The Phase Method In the phase method, a laser beam of a predetermined wavelength (hundreds of megahertz) is intensity-modulated and transmitted from the transmitter 50. The wavelength dispersion characteristic is obtained on the basis of a phase difference between the optical fibers F and OF detected by the receiver 51.

(2) The Pulse Method

In the pulse method, a plurality of pulse beams $\lambda 1, \lambda 2, \ldots$ of different wavelengths are transmitted from the transmitter 50, and the pulse beams $\lambda 1, \lambda 2, \ldots$ of the respective wavelengths are detected by the receiver 51. The wavelength dispersion characteristic is obtained on the basis of the detection times of the wavelengths (delay time).

However, in the measurement of the wavelength dispersion characteristic according to the conventional art, since the transmitter 50 and the receiver 51 must be arranged at the respective ends of the optical fiber F, the following problem arises.

A measurement operator must be located at each of the sites of the transmitter 50 and the receiver 51. In addition, when the measurement is carried out, the measurement operators must establish communications with each other. Thus, the problem is that the measurement is inevitably complicated.

Jpn. Pat. Appln. KOKAI Publication No. 62-207927 and Jpn. Pat. Appln. KOKAI Publication No. 4-285836 disclose a wavelength dispersion measuring apparatus that measures a wavelength dispersion characteristic of an optical fiber from an end of the optical fiber by means of an OTDR.

However, the former wavelength dispersion measuring apparatus is disadvantageous in structure in that a Faraday rotation element (polarization canceling plate) is required as a structural feature.

Further, as regards the former and latter wavelength dispersion measuring apparatuses, in the case where an optical fiber to be measured is formed of a plurality of optical fibers connected in series by at least one connecting point, how to calculate the wavelength dispersion values of the optical fibers and easy calculation thereof are not disclosed.

DISCLOSURE OF INVENTION

The present invention was made to solve the above problem, and has an object to provide a wavelength dispersion measuring apparatus for, in a case where an optical fiber to be measured is formed of a plurality of optical fibers connected in series by at least one connecting point, measuring wavelength dispersion values of the respective optical fibers from an end of the optical fiber to be measured; an OTDR having such a wavelength dispersion measuring function; such an optical wavelength dispersion measuring method; and a storage medium storing such a wavelength dispersion processing program.

According to an embodiment of the present invention, there is provided a wavelength dispersion measuring apparatus comprising:

a light source (2) for emitting optical pulses of a plurality of wavelengths;

branching means (3) for transmitting the optical pulses emitted from the light source (2) to one end of an optical fiber to be measured and extracting reflected lights from the optical fiber to be measured;

light receiving means (11) for detecting the reflected lights from the branching means (3) and outputting them as measurement data; and processing means (8) for calculating a wavelength dispersion value of the optical fiber to be measured, by detecting a time of emitting the optical pulse of each of the plurality of wavelengths from the light source (2) and a time of receiving the reflected light of the wavelength by the light receiving means (11), wherein, in a case where the optical fiber to be measured is formed of a plurality of optical fibers connected in series by at least one connecting point, the processing means calculates wavelength dispersion values of the respective optical fibers by detecting the time of emitting the optical pulse, a time of receiving a reflected light from the connecting point and a time of receiving a reflected light from another end of the optical fiber to be measured.

BEST MODE FOR CARRYING OUT THE INVENTION

First, outlines of the present invention will be described.

To solve the above problem, a wavelength dispersion measuring apparatus of the present invention comprises a light source (2), located at an end of an optical fiber to be measured laid in an optical communication path, for emitting measurement lights of a plurality of wavelengths to the optical fiber to be measured; light receiving means (11) for receiving reflected lights from the optical fiber to be measured and performing detection output; and processing means (8) for calculating a wavelength dispersion value of the optical fiber to be measured from a delay time of the reflected lights of the respective wavelengths based on a time of emitting the measurement lights of the respective wavelengths and a time of receiving the reflected lights detected by the light receiving means.

In a case where the optical fiber to be measured is formed of a plurality of optical fibers connected in series by at least one connecting point, the processing means (8) calculates wavelength dispersion values of the optical fibers by detecting a time of emitting the optical pulse, a time of receiving a reflected light from the connecting point and a time of receiving a reflected light from the other end of the optical fiber to be measured.

The processing means (8) may be constructed to subject the measurement data output from the light receiving means (11) to fitting with a quadratic function curve to detect the time of receiving the reflected light from the connecting point, thereby calculating the wavelength dispersion values of the optical fibers.

The light receiving means (11) may have a light receiving element (4) for outputting a detection signal of a value corresponding to the level of the reflected light and an A/D converter (6) for A/D converting the detection signal of the light receiving element.

The light source (2) may be constituted by a variable-wavelength light source by which the wavelength is variable within a predetermined range having a center at a reference wavelength.

The light source (2) may be constituted by a plurality of light emitting elements for emitting a light of a wavelength corresponding to a minimum value of dispersion in accordance with the kind of the optical fiber to be measured and lights of at least two wavelengths different from the aforementioned wavelength.

Further, the light source (2) may comprise a light emitting element for emitting a light having a wavelength of 1.31 $\mu$m, a light emitting element for emitting light having a wavelength of 1.55 $\mu$m and a light emitting element for emitting a light having a wavelength of 1.625 $\mu$m.

An OTDR of the present invention is connected to an end of an optical fiber to be measured lied in an optical communication path, and emits a measurement light to the optical fiber to be measured and detects an optical loss and a defective point of the optical fiber to be measured based on a reflected light. The OTDR comprises light emitting elements of a plurality of wavelengths; branching means (3) for branching a reflected light from the optical fiber to be measured to a side of a light receiving element; the light receiving element (4) for receiving the reflected light branched from the branching means and outputting a detection signal of a value corresponding to a level of the received light; an A/D converter (6) for A/D converting the detection signal from the light receiving element and outputting the converted signal to processing means; and the processing means (8) for approximating a wavelength characteristic of a delay time from a delay time of the reflected lights of the respective wavelengths based on a time of emitting the measurement lights of the respective wavelengths from the light source and a time of receiving the reflected lights detected by the light receiving element and thereafter calculating a wavelength dispersion value of the optical fiber to be measured based on the approximation.

In a case where the optical fiber to be measured is formed of a plurality of optical fibers connected in series by at least one connecting point, the OTDR of the present invention may be constructed so that the processing means (8) calculates the wavelength dispersion values of the optical fibers by detecting a light emitting time of the optical pulse, a light receiving time of a reflected light from the connecting point and a light receiving time of a reflected light from the other end of the optical fiber to be measured.

Further, the OTDR of the present invention may be constructed so that, when the processing means (8) calculates the wavelength dispersion values of the optical fibers, measurement data obtained by the light receiving means (11) is subjected to fitting with a quadratic function curve to obtain the light receiving time of the reflected light from the connecting point, thereby calculating the wavelength dispersion values of the optical fibers.

A wavelength dispersion measuring method according to the present invention obtains a wavelength dispersion value of an optical fiber to be measured by inputting measurement lights of a plurality of wavelengths through one end of the optical fiber to be measured and based on a difference in delay time between reflected lights of the respective wavelengths returned from the optical fiber to be measured.

The wavelength dispersion measuring method according to the present invention may obtain an approximate expression of a wavelength characteristic in a delay time by inputting measurement lights of a plurality of wavelengths through one end of an optical fiber to be measured and based on a difference in delay time between reflected lights of the respective wavelengths returned from the optical fiber to be measured, and obtain a wavelength dispersion value of the optical fiber to be measured based on the approximate expression.

Further, in the wavelength dispersion measuring method of the present invention, in a case where the optical fiber to be measured is formed of a plurality of optical fibers connected in series by at least one connecting point, wavelength dispersion values of the respective optical fibers may be calculated by detecting a time of emitting the optical pulse, a time of receiving a reflected light from the connecting point and a time of receiving a reflected light from another end of the optical fiber to be measured.

Furthermore, when wavelength dispersion values of the respective optical fibers are calculated, the wavelength dispersion measuring method of the present invention may subject measurement data to fitting with a quadratic function curve to detect the time of receiving the reflected light from the connecting point, thereby calculating the wavelength dispersion values of the respective optical fibers.

A storage medium of the present invention stores a wavelength dispersion processing program for measuring a wavelength dispersion value of an optical fiber to be measured by using an apparatus comprising: a light source, connected to one end of the optical fiber to be measured, for inputting measurement lights of a plurality of different wavelengths to the one end; light receiving means for receiving a reflected light from the optical fiber to be measured; and processing means for controlling portions of the apparatus. The wavelength dispersion processing program causes the light source to input measurement lights of a plurality of wavelengths to the optical fiber to be measured, detects delay times of the respective wavelengths when reflected lights returned from the optical fiber to be measured are detected by the light receiving means, thereby obtaining an approximate expression of a wavelength characteristic in a delay time, and obtains a wavelength dispersion value of the optical fiber to be measured based on the approximate expression.

Further, the wavelength dispersion processing program may obtain a distance position of each connecting point of the optical fiber to be measured based on a time of emitting the measurement light from the light source and the time of receiving the reflected lights detected by the light receiving means, and obtain an approximate expression of a wavelength characteristic in a delay time from a delay time of the reflected light of the respective wavelengths in units of said plurality of optical fibers connected to form the optical fiber to be measured, thereby obtaining wavelength dispersion values of the respective optical fibers based on the approximate expression.

Furthermore, in a case where the optical fiber to be measured is formed of a plurality of optical fibers connected in series by at least one connecting point, the wavelength dispersion processing program may calculate wavelength dispersion values of the respective optical fibers by detecting a time of emitting the optical pulse, a time of receiving a reflected light from the connecting point and a time of receiving a reflected light from another end of the optical fiber to be measured.

Further, when the wavelength dispersion processing program calculates wavelength dispersion values of the respective optical fibers, it may subject the measurement data to fitting with a quadratic function curve to detect the time of receiving the reflected light from the connecting point, thereby calculating the wavelength dispersion values of the respective optical fibers.

With the wavelength dispersion measuring apparatus having the above structure, the wavelength dispersion measuring apparatus is connected to an end of the optical fiber to be measured, which is laid in the optical communication path, and measurement lights of a plurality of wavelengths are successively emitted from the light source (2) to the optical fiber.

The reflected lights from the optical fiber is received by the light receiving element (4).

The processing means (8) calculates a wavelength dispersion value of the optical fiber from the delay time of the reflected lights of the respective wavelengths based on the light emitting time of the measurement lights of the respective wavelengths and the light receiving times of the reflected lights received by the light receiving element (4).

When the processing means (8) calculates wavelength dispersion values of the optical fibers, respectively, it subjects measurement data obtained by the light receiving means (11) to fitting with a quadratic function curve to obtain the light receiving times of the reflected lights at the connecting point, thereby calculating the respective wavelength dispersion values of the optical fibers.

Embodiments of the present invention outlined above will be described below with reference to the accompanying drawings.

First Embodiment

Figure 1:
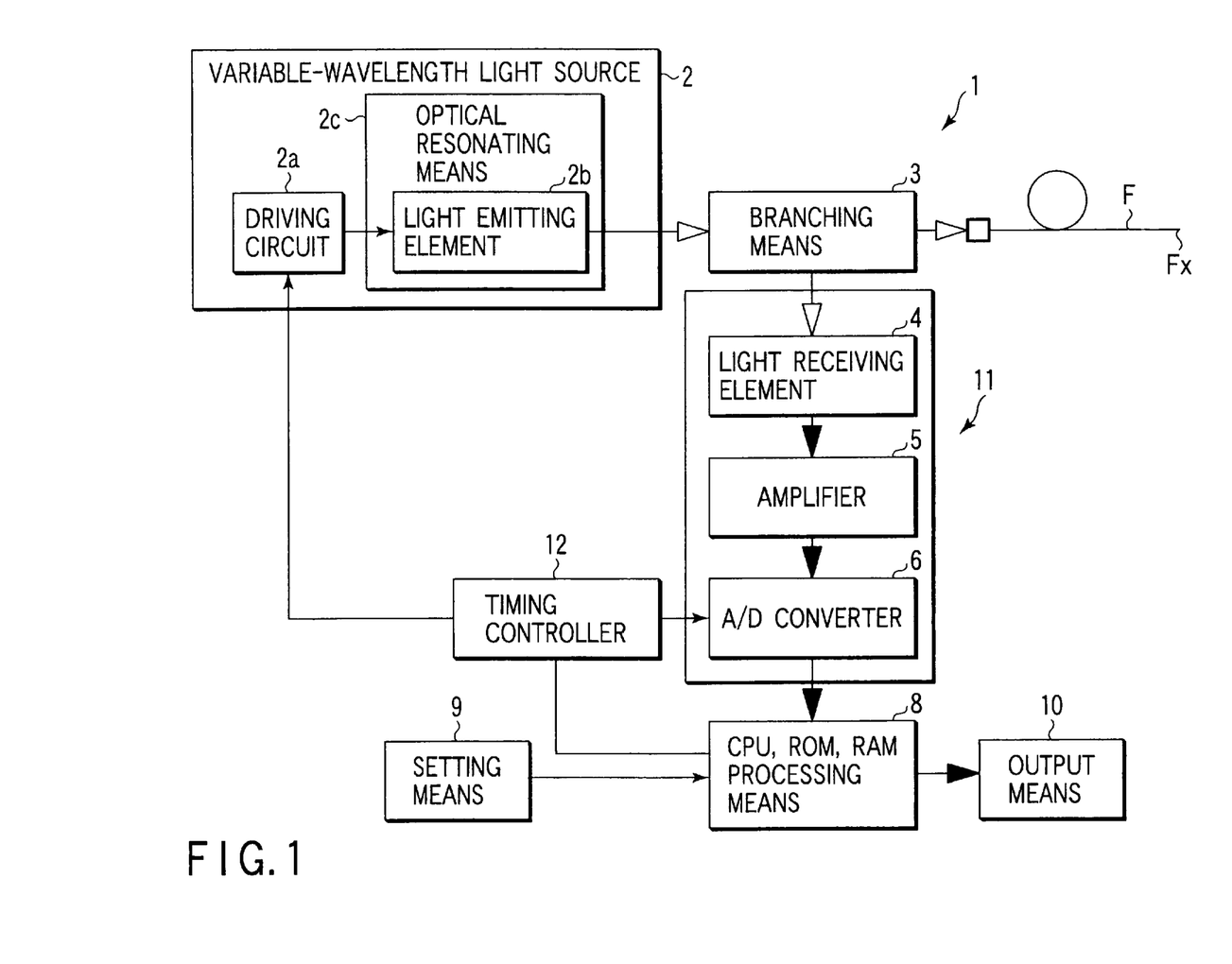
FIG. 1 is a block diagram showing the structure of a wavelength dispersion measuring apparatus according to a first embodiment of the present invention.

FIG. 1 is a block diagram showing the structure of a wavelength dispersion measuring apparatus according to a first embodiment of the present invention.

In FIG. 1, a reference numeral 1 denotes a wavelength dispersion measuring apparatus using an OTDR. The wavelength dispersion measuring apparatus 1 is connected to an end of an optical fiber F to be measured, which is laid as an optical communication path or the like.

An internal structure of the wavelength dispersion measuring apparatus 1 using the OTDR will be described below.

A variable-wavelength light source 2 has a driving circuit 2a, a light emitting element 2b, such as a laser diode (LD), and optical resonating means 2c. It emits a pulsing measurement light (laser beam) having a center wavelength $\lambda$.

The driving circuit 2a controls driving of the light emitting element 2b.

The optical resonating means 2c is an external-type apparatus, which is arranged outside the light emitting element 2b and which has a wavelength selecting function. For example, a diffraction grating, a prism or an acoustic optical element is used as the optical resonating means.

With this structure, the measurement light is variable within a predetermined range of $\pm\Delta\lambda$ with respect to the center wavelength $\lambda(\lambda 1, \lambda 2, \ldots \lambda n)$.

The pulsing measurement light emitted from the variable-wavelength light source 2 is incident on the optical fiber F via the branching means 3.

For example, an optical directional coupler is used as the branching means 3.

The branching means 3 branches a reflected light (pulsing Fresnel reflected light and continuous backscattering light) returned from the side of the optical fiber F toward the side of a light receiving element 4.

The light receiving element 4 is constituted by a photodiode (PD) for receiving backscattering light, and outputs a detection signal when it receives light.

The detection signal is amplified by an amplifier 5, and A/D converted by an A/D converter 6 in a predetermined sampling cycle and output to processing means 8.

The processing means 8 has a CPU and memory sections, such as a ROM and a RAM. The CPU performs centralized control of the component portions inside the wavelength dispersion measuring apparatus 1.

The processing means 8 also measures a waveform dispersion characteristic of the optical fiber F based on a wavelength dispersion measuring program prestored in the memory sections, such a ROM, using the procedures as will be described later.

Setting means 9 sets parameters or the like necessary for wavelength dispersion characteristic measurement to the processing means 8 by operation input or the like.

Data on the wavelength dispersion characteristic processed by the processing means 8 is output to output means 10.

The output means 10 is constituted by a display device for displaying the wavelength dispersion characteristic, an interface (I/F) for externally outputting the wavelength dispersion characteristic data, etc.

A timing controller 12 controls the driving circuit 2a under the control of the processing means 8, thereby controlling a time of emitting the measurement light by the light emitting element 2b and a time of sampling the detection signal by the A/D converter 6 when backscattering light is detected.

Contents of a process of measuring a wavelength dispersion characteristic of the optical fiber F by means of the wavelength dispersion measuring apparatus 1 using the above OTDR will be described with reference to the flowchart shown in FIG. 2.

Initial setting values (for example, an index n of refraction, a plurality of wavelengths $\lambda 1, \lambda 2, \ldots, \lambda n$, used as measurement lights, etc.) relating to the kind of the optical fiber F laid in an optical communication path or the like are set in the setting means 9 in advance (step S1).

Upon start of a measuring operation of a dispersion characteristic measurement, the processing means 8 varies the measuring wavelength $\lambda i$, so that measurement at each wavelength is started from $\lambda 1$ (step S2).

First, the timing controller 12 controls the driving circuit 2a to cause the light emitting element 2b to emit a measurement light of the wavelength $\lambda 1$.

This measurement light is incident on the optical fiber F through the branching means 3.

Figure 3:
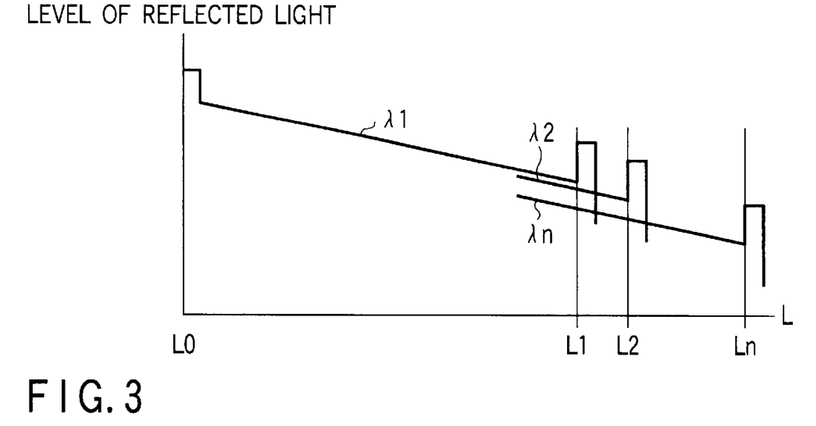
FIG. 3 is a diagram showing the level of backscattering light.

The optical fiber F returns a reflected light of the measurement light (Fresnel reflected light and backscattering light), as shown in FIG. 3, to the wavelength dispersion measuring apparatus 1 using the OTDR.

The wavelength dispersion measuring apparatus 1 using the OTDR receives the reflected light at a level as shown in FIG. 3.

In FIG. 3, the abscissa denotes a length L and the ordinate denotes a level of the reflected light. The length L corresponds to the time in which the backscattering light returns to the wavelength dispersion measuring apparatus 1.

As shown in FIG. 3, the measurement light of the wavelength $\lambda 1$ is emitted from the wavelength dispersion measuring apparatus 1 at a distance L0.

Backscattering light whose level is gradually lowered with the distance of the laid optical fiber is detected from the optical fiber F.

Fresnel reflected light at a far end Fx of the optical fiber F (shown in FIG. 3) is detected in the distance L1 portion. The rising point of the waveform of the Fresnel reflected light corresponds to the distance L1 to the far end Fx of the optical fiber F.

The light receiving element 4 successively detects the levels of the reflected lights in a period corresponding to the distance L1 to the far end Fx, as shown in FIG. 3.

The processing means 8 temporarily stores the distance L1 to the far end at the wavelength $\lambda 1$ of the measurement light (step S3).

Then, the processing means 8 varies the measurement wavelength $\lambda 1$ of the measurement light emitted from the light emitting element 2b to the next wavelength $\lambda 2$, and the processes of the above steps S2 and S3 are executed again.

The processing means 8 temporarily stores the distance L2 to the far end at the wavelength $\lambda 2$ of the measurement light.

As described above, the processing means 8 causes the light emitting element 2b to change the wavelength $\lambda i$ of the measurement light by the number n of the set wavelengths, and successively stores detection times Li at which the far end is detected (step S4).

Thereafter, the processing means 8 obtains the delay times $T\lambda i$ ($T\lambda 1, T\lambda 2, \ldots T\lambda n$) of the respective waveforms $\lambda i$ ($\lambda 1, \lambda 2, \ldots \lambda n$) by the following equation (1) (step S5).

$$T\lambda i(ps) = 2 \times L \lambda i \times IOR\lambda i / C \tag{1}$$

where $IOR\lambda i$ represents a set value of IOR (an index of refraction of the optical fiber group) of each wavelength in the wavelength dispersion measuring apparatus 1, and C denotes the speed of light ($2.99792458 \times 10^8$ m/sec).

The above delay time $T\lambda i$ is divided by the length of the optical fiber F, thereby obtaining the delay time $t\lambda i$ per unit length by the following equation (2) (step S6).

$$t\lambda i(ps/km) = T\lambda i / L\lambda 1 \tag{2}$$

In this manner, the length $L\lambda i$ of the optical fiber F at, for example, the predetermined wavelength $\lambda 1$ is used.

Then, the processing means 8 obtains an approximate expression of the wavelength characteristic of the delay time (step S7).

Based on the delay time $t\lambda i$ per unit length obtained for each wavelength $\lambda i$, the delay characteristic D ($\lambda$) with respect to the wavelength is approximated with a first approximate expression (3) indicated below, and coefficients a, b and c, which are matched best with the measurement result, are obtained.

First Approximate Expression:

$$D(\lambda) = a + b\lambda 2 + c\lambda - 2 \tag{3}$$

The first approximate expression is applied to an optical fiber F having zero dispersion in a 1.31 μm band.

The following second approximate expression is applied to an optical fiber F having zero dispersion in a 1.55 μm band.

Second Approximate Expression:

$$D(\lambda) = a\lambda 2 + b\lambda + C \tag{3}$$

The first or second approximate expression is selected in accordance with the kind of the optical fiber F set in advance (in the initial setting of the step S1) by the setting means 9 of the wavelength dispersion measuring apparatus 1.

Figure 4:
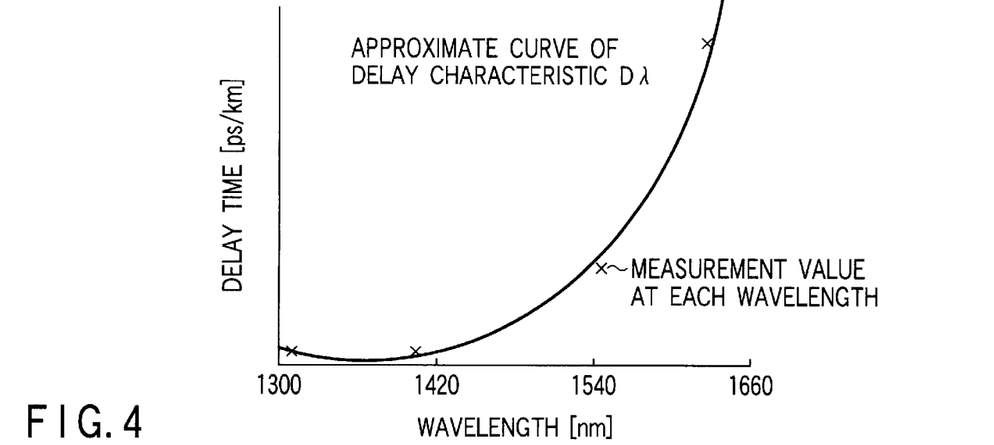
FIG. 4 is a diagram showing an approximate curve of a delay characteristic depending on the wavelength of the fiber.

FIG. 4 is a diagram showing an approximate curve of a delay characteristic depending on the wavelength of the optical fiber F obtained by the above approximating operation.

In the example shown in FIG. 4, the approximate curve is obtained by four wavelengths λi (λ1, λ2, λ3 and λ4).

The wavelength dispersion value S(s) of the optical fiber F is calculated by using the following equation (4) based on the above approximate expression (3) (step S8):

In the case where the first approximate expression is used, $$S(\lambda)=2b\lambda-2C-\lambda 3 \tag{4}$$

In the case where the second approximate expression is used, $$S(\lambda)=2a\lambda+b \tag{4}$$

$S(\lambda)$ is obtained by differentiating $D(\lambda)$ with $\lambda$.

Figure 5:
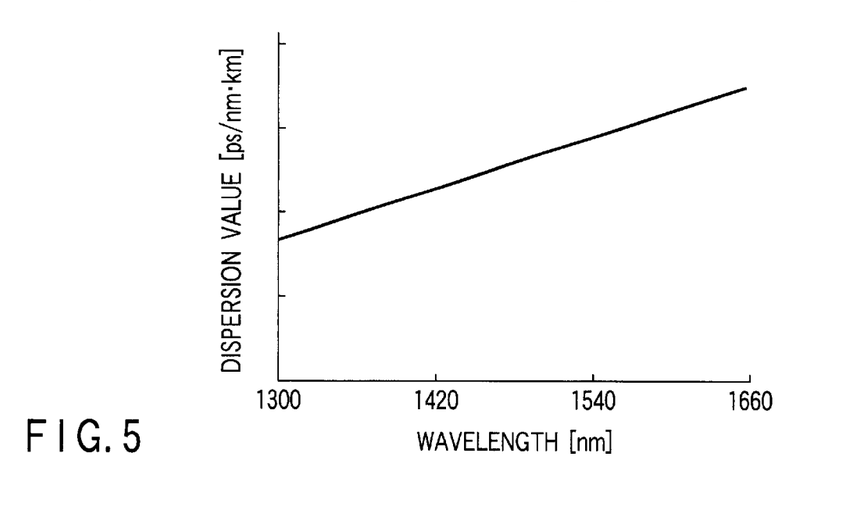
FIG. 5 is a diagram showing a wavelength dispersion characteristic.

FIG. 5 is a diagram showing a wavelength dispersion characteristic obtained by the above operation.

Based on the wavelength dispersion characteristic thus obtained, a dispersion compensating optical fiber (DCF) (not shown) is connected to the far end of the optical fiber F.

Since the dispersion value of the dispersion compensating optical fiber is specified, an optical fiber having a length necessary for the compensation is provided at the far end based on the dispersion value of the optical fiber F.

With the wavelength dispersion measuring apparatus 1, the wavelength dispersion characteristic of the optical fiber F can be measured accurately. Therefore, the necessary length of the dispersion compensating optical fiber can be obtained accurately. As a result, dispersion compensation with high accuracy is possible.

The accurate dispersion compensation allows elimination of influence of dispersion particularly when high-frequency transmission is performed by means of the optical fiber F, with the result that the transmission efficiency can be improved.

The wavelength λi of the measurement light emitted by the wavelength dispersion measuring apparatus 1 is set in accordance with the kind of the optical fiber F.

For example, in the case where an optical fiber having zero dispersion in a 1.31 μm band is used as the optical fiber F, the variable-wavelength light source 2 first emits a measurement light of a reference wavelength λi of 1.31 μm as the wavelength λi, to obtain the above delay time Tλ1.

Thereafter, measurement lights of the wavelengths λ2, ... λn, which are different by ±Δλ from the reference wavelength λ1, are emitted, whereby the delay times Tλ2, ..., Tλn can be obtained.

The wavelength ±Δλ may be of any value within the range of the wavelengths that the variable-wavelength light source 2 can emit.

Further, the wavelength ±Δλ may be the same on the + and − sides of the reference wavelength λ1.

To obtain a wavelength dispersion characteristic, it is only necessary that wavelength dispersion be measured at three wavelengths or more, thereby obtaining an approximate curve $D(\lambda)$.

Figure 10:
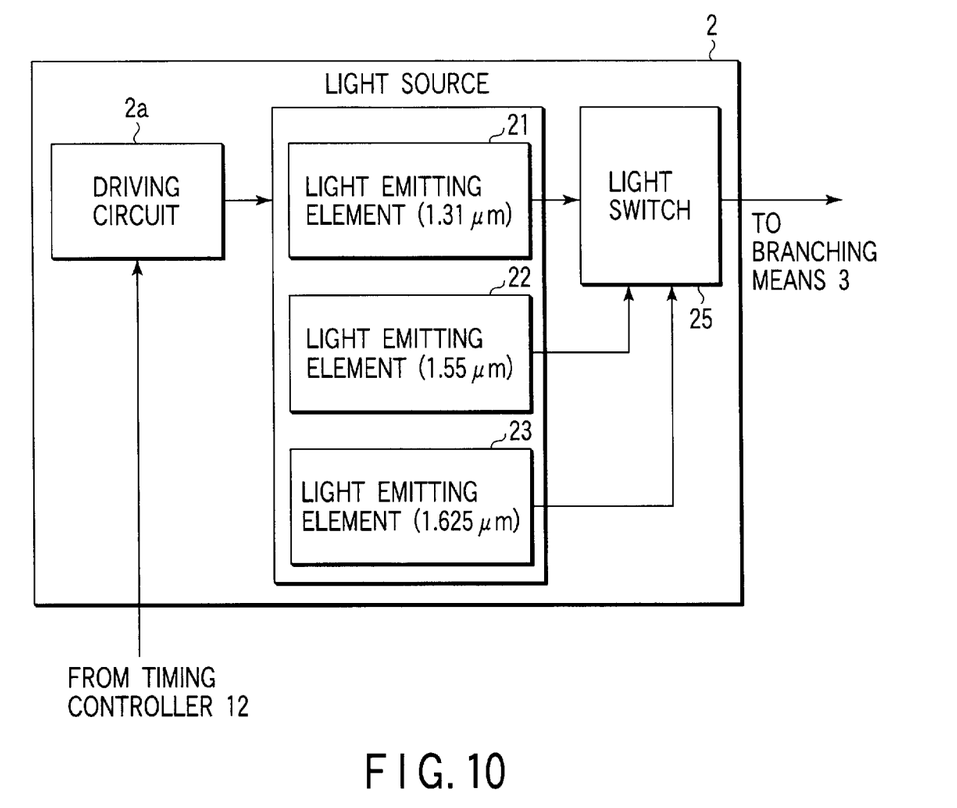
FIG. 10 is a block diagram showing a main part of a modification of the first embodiment.

For example, in a modification as shown in FIG. 10, the variable-wavelength light source 2 of the wavelength dispersion measuring apparatus 1 may have a plurality of light emitting elements 21, 22 and 23 for emitting lights of the respective wavelengths (e.g., 1.31 μm, 1.55 μm and 1.625 μm) in accordance with the kind (the minimum value of dispersion) of the optical fiber F so as to switch them by an optical switch 25.

Second Embodiment

Figure 6:
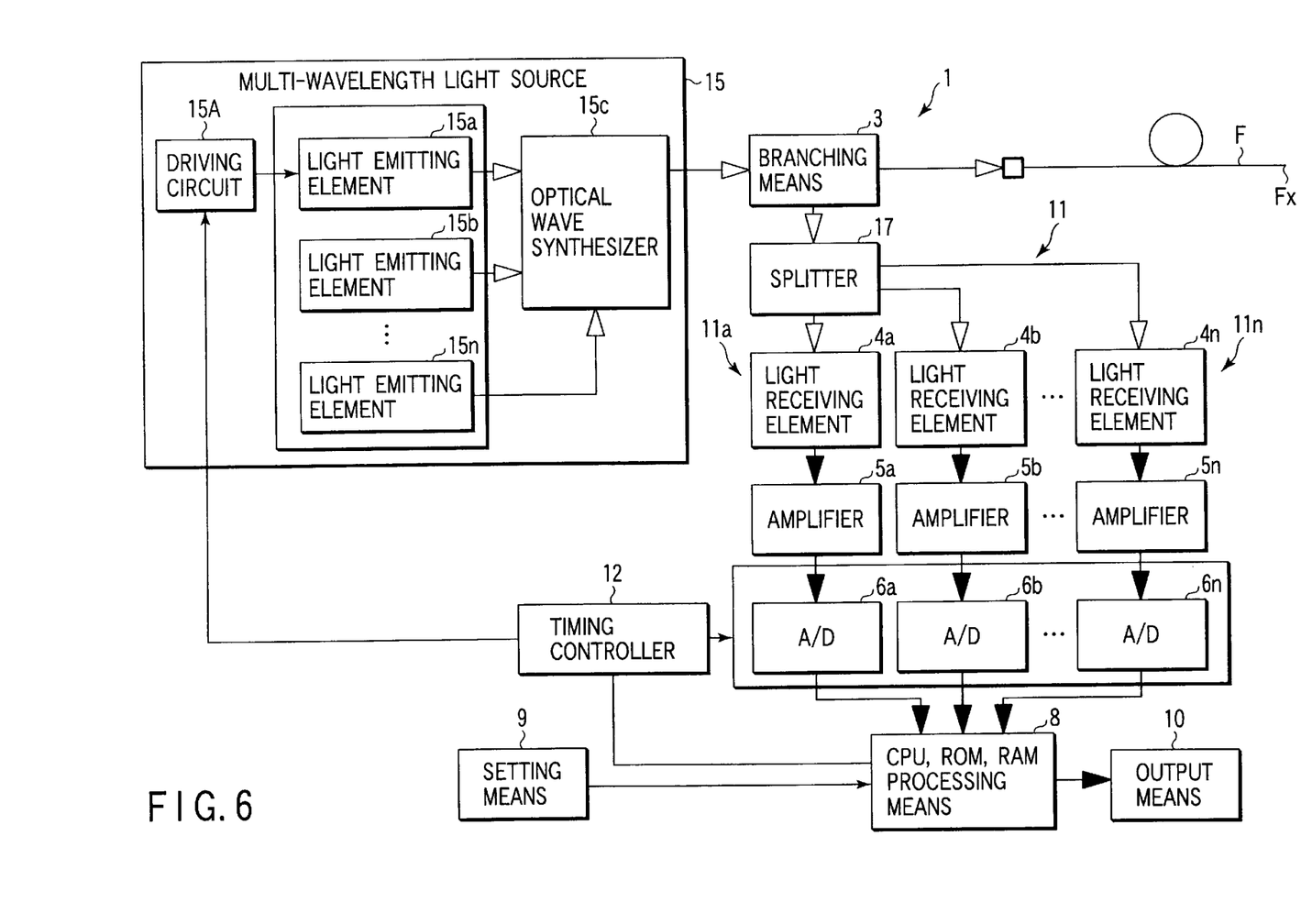
FIG. 6 is a block diagram showing the structure of a wavelength dispersion measuring apparatus according to a second embodiment of the present invention.

FIG. 6 is a block diagram showing the structure of a wavelength dispersion measuring apparatus according to a second embodiment of the present invention.

As shown in FIG. 6, in the second embodiment, a multi-wavelength light source 15 for simultaneously emitting lights of a plurality of wavelengths λi (λ1, λ2, ... μn) is used as a light source of the wavelength dispersion measuring apparatus 1 using an OTDR, in place of the variable-wavelength light source 2 described above in the first embodiment.

The multi-wavelength light source 15, as shown in FIG. 6, comprises a plurality of light emitting elements 15a, 15b, ..., 15n, for respectively emitting light of a single wavelength of λ1, λ2, ..., λn, a driving circuit 15A for driving the light emitting elements 15a, 15b, ..., 15n, and an optical wave synthesizer 15C for synthesizing and emitting the lights of the respective wavelengths.

The multi-wavelength light source 15 simultaneously emits lights of the wavelengths λi from the optical wave synthesizer 15C.

A splitter 17 is provided on a side of branching means 3 from which backscattering light is branched, so that the light of the wavelength λ1 is split into lights of the respective wavelengths, which are received by light receiving portions 11a, 11b, ..., 11n of a plurality of routes.

The light receiving portions 11a, 11b, ..., 11n are respectively provided with light receiving elements 4a, 4b, ..., 4n, amplifiers 5a, 5b, ..., 5n and A/D converters 6a, 6b, ..., 6n of a plurality of routes corresponding to the light receiving element 4, the amplifier 5 and the A/D converter 6 of the first embodiment described above.

The light receiving elements 4a, 4b, ..., 4n of the respective routes receive lights of the respective split wavelengths λi.

The amplifiers 5 (5a, 5b, ..., 5n) of the respective routes amplify received light outputs of the respective wavelengths λi.

The A/D converters of the respective routes A/D convert measurement signals of the respective wavelengths λi and output them to processing means 8.

In the measurement by means of the multi-wavelength simultaneous emission described above, the processing means 8 can obtain the distance Li to the far end Fx of the optical fiber F at each wavelength λi.

Figure 2:
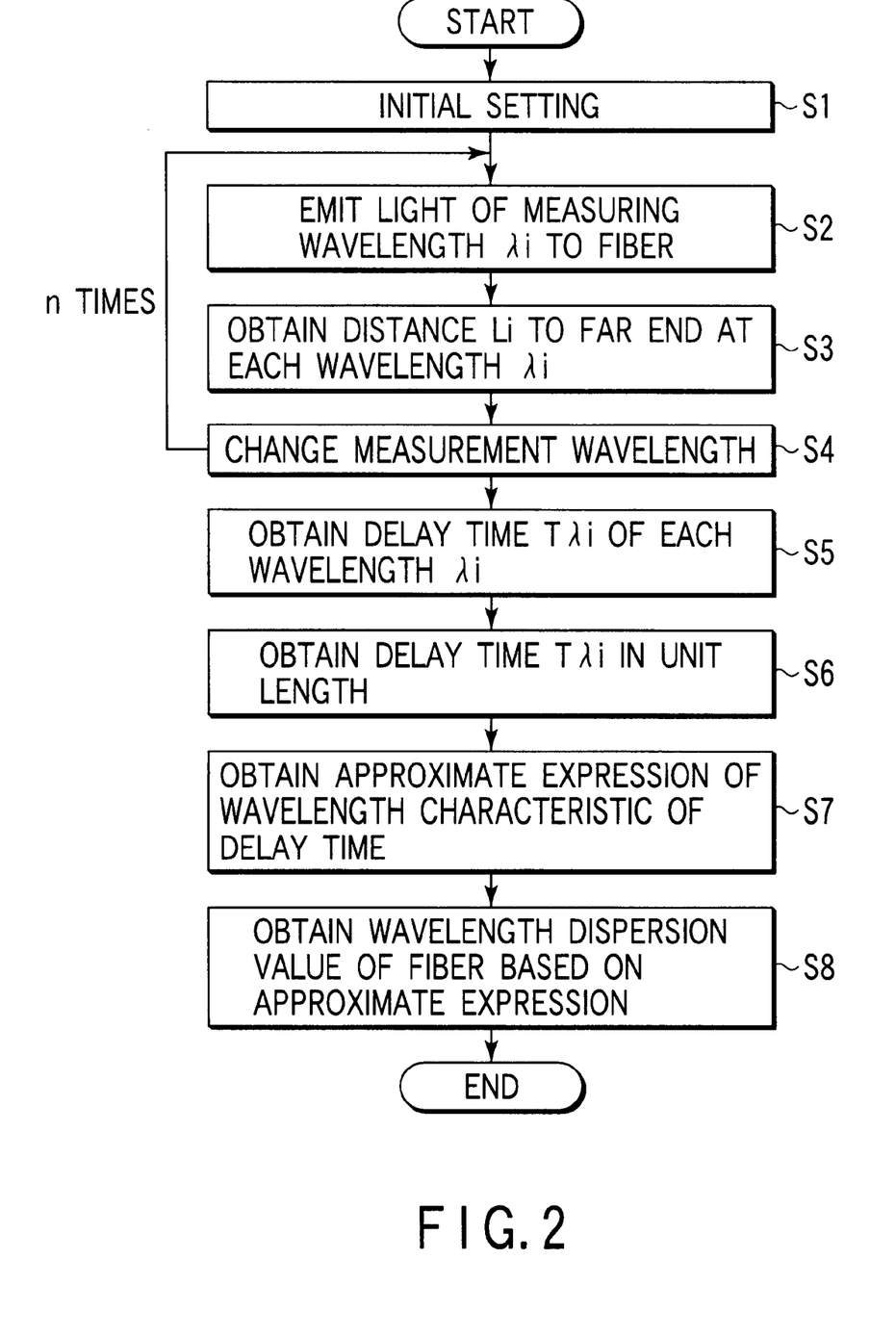
FIG. 2 is a flowchart showing contents of a process of measuring a wavelength dispersion characteristic according to the first embodiment.

In other words, the processing means 8 can simultaneously execute the above processes (the steps S2, S3 and S4 shown in FIG. 2).

In the second embodiment, the processes after the steps S3 are the same as those in the first embodiment.

Third Embodiment

A wavelength dispersion measuring apparatus according to a third embodiment of the present invention will be described.

The structure of the wavelength dispersion measuring apparatus according to the third embodiment is the same as that of the first embodiment shown in FIG. 1.

Figure 7A:
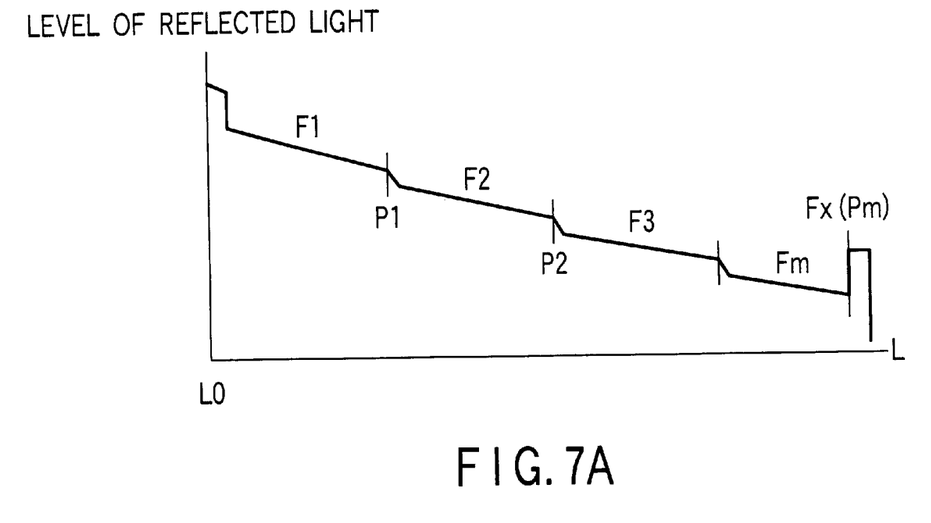
FIGS. 7A and 7B are diagrams for explaining measurement of wavelength dispersion characteristics of the respective fibers by a wavelength dispersion measuring apparatus according to a third embodiment of the present invention.
Figure 7B:
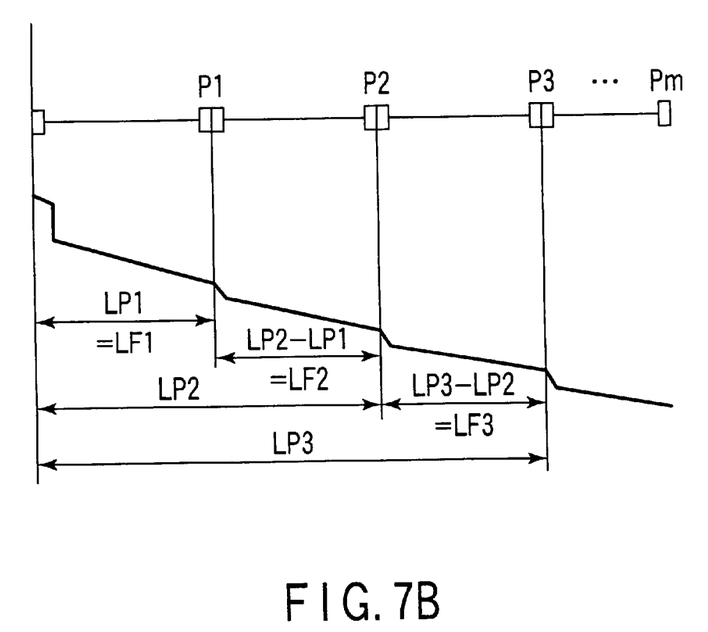

FIGS. 7A and 7B are diagrams showing backscattering characteristics of a fiber F measured by a wavelength dispersion measuring apparatus 1 (corresponding to details of FIG. 3).

As shown in FIG. 7A, the optical fiber F laid over a long distance has a plurality of connecting points P (P1, P2, ..., Pm), and attenuation occurs at each connecting point P (P1, P2, ..., Pm).

The connecting points P are formed by fusing connection or connector connection.

The backscattering light formed by a plurality of optical fibers F (F1, F2, . . . , Fm) has a difference in level at each connecting point P, as shown in FIG. 7A.

The processing means 8 obtains a distance Lp to each connecting point P of the optical fibers F based on the difference in level at the connecting point P of the optical fibers F, when backscattering light is received.

More specifically, as shown in FIG. 7B, the point at which a difference in level occurs corresponds to the distance Lp of the connecting point P.

The distance Lp is obtained on the basis of the time (time t) from the emission of the measurement light to the reception of the backscattering light, as described before.

The length LFmi of each optical fiber with respect to the wavelength λi is obtained on the basis of the distance Lpmi to each connecting point by the following equation:

$$LFmi = Lpmi - Lp(m-1)i.$$

The processing means 8 executes the same process as that in the first embodiment, using LFmi with respect to each fiber Fm, so that the dispersion characteristics of the respective fibers F1, F2, . . . , Fm can be obtained.

Figure 8:
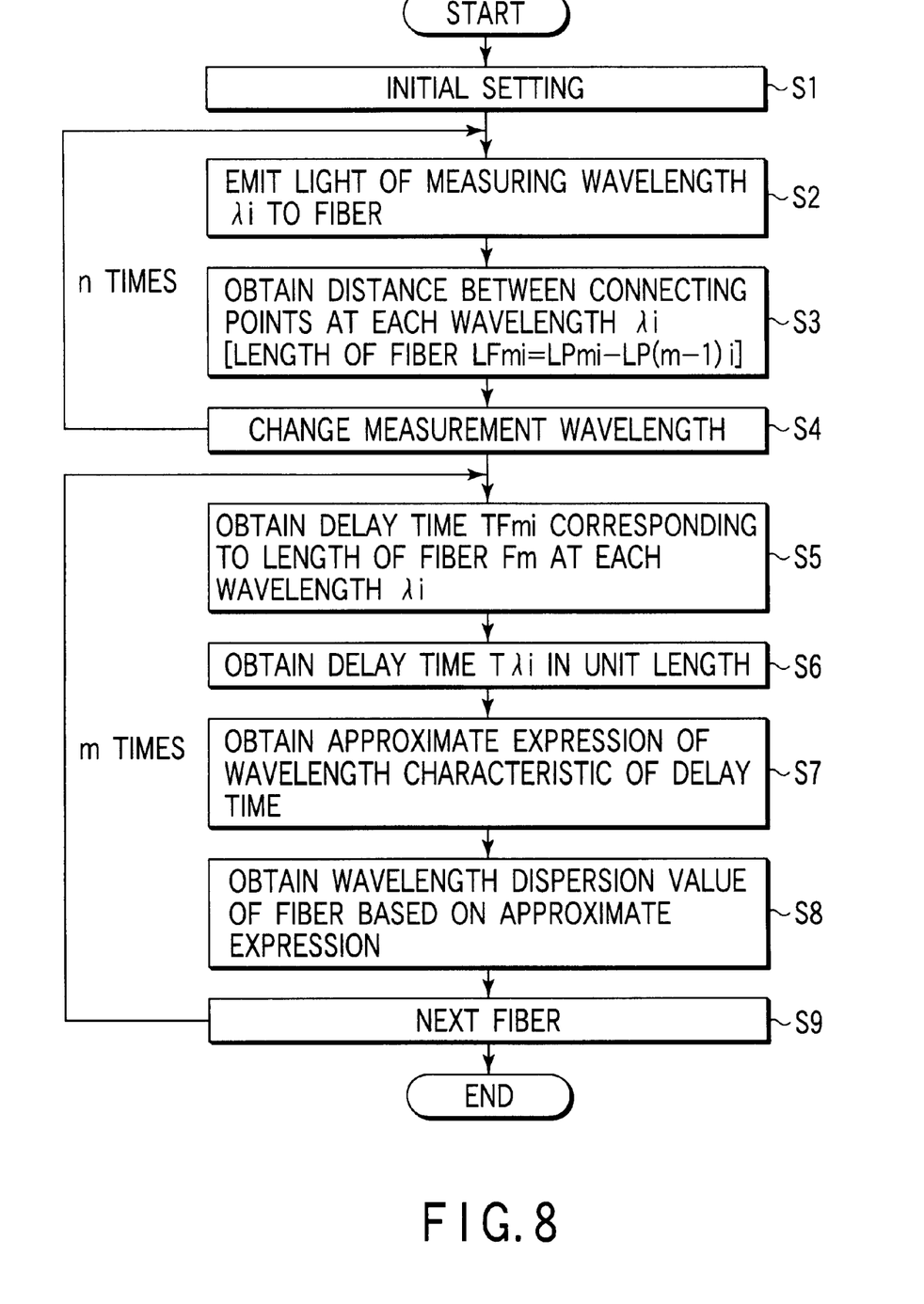
FIG. 8 is a flowchart showing contents of a process of measuring a wavelength dispersion characteristic according to the third embodiment.

FIG. 8 is a flowchart showing operation procedures in the third embodiment.

The operation procedures in the third embodiment are substantially the same as those of the operation in the first embodiment shown in FIG. 2.

The third embodiment differs from the first embodiment in that it additionally has a step of detecting a distance L of each optical fiber F (step S3) and a step of successively detecting the optical fibers F (step S9).

Fourth Embodiment

A wavelength dispersion measuring apparatus according to a fourth embodiment of the present invention will now be described.

The structure of the wavelength dispersion measuring apparatus according to the fourth embodiment is similar to that of the wavelength dispersion measuring apparatus 1 using the OTDR according to the first embodiment. However, in the fourth embodiment, the processing means 8 incorporates an auto-measurement algorithm including a fitting interpolation function using a quadratic function curve in detection of a far end (peak).

Figure 9:
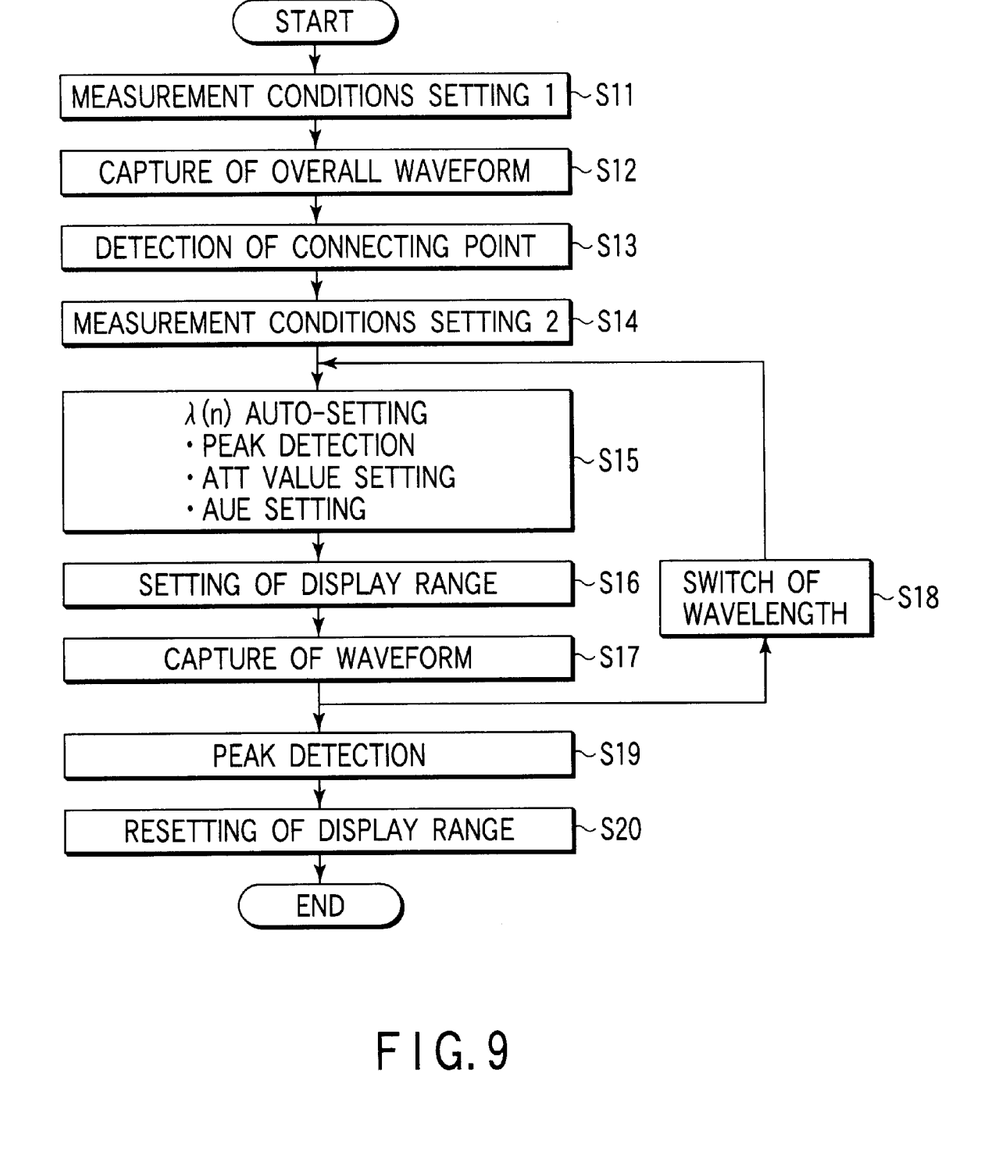
FIG. 9 is a flowchart showing contents of a process of measuring a wavelength dispersion characteristic according to a fourth embodiment of the present invention.

FIG. 9 is a flowchart showing operation procedures in the fourth embodiment.

When the process flow according to the auto-measurement algorithm is started, first, measurement conditions for capturing the overall waveform are set (step S11).

Outline of Process

The normal auto-setting process is carried out (that is, a waveform is captured to change the measurement conditions in accordance with the waveform), and setting for capturing the overall waveform is carried out.

Detailed Explanation

In the case of measurement of the overall wavelength (All), the wavelength is fixed to 1550 nm (if 1550 nm is not present, a wavelength nearest to 1550 nm is selected).

Based on the setting of the measurement conditions in the step S11, capture of the overall waveform is executed (step S12).

Then, detection of a connecting point is executed (step S13).

The position of the connecting point (or the other end) for wavelength dispersion measurement is confirmed or changed based on the result of the detection of the connecting point.

Outline of Process

Detection of the connecting point of the captured data is automatically performed.

The detected position of the connecting point (or the other end) is used in the subsequent process.

First, a sampling resolution, a sampling range, etc. are set in measurement conditions setting (step S14).

Outline of Process

Setting of measurement conditions for dispersion measurement is performed.

This setting remains unchanged, even when the wavelength is switched.

Detailed Explanation

The following measurement conditions are set.

Distance range: the same as that in the case of the capture of the overall waveform Pulse width: fixed to 10 ns Sampling point: normal mode Sampling resolution: The resolution is determined to be 5 cm resolution.

Next, λ (n) auto-setting (peak detection, ATT value setting, AVE setting, etc.) is executed (step S15).

Outline of Process

An ATT (attenuator) and the number of AVE (average) times, the settings of which are varied at every wavelength, are set.

The ATT is provided in the amplifier 5 shown in FIG. 1 and set to a level such that the reflected light at the connecting point is not saturated.

The AVE is performed in the processing means 8, in which the measurement data from the A/D converter 6 shown in FIG. 1 are added a predetermined numbers of times and averaged. The averaged data is output.

The set values are determined by detecting a peak in a range having its center at the detected position of the connecting point (or the other end), selecting an attenuator in which the detected peak is not saturated, and determining the number of times of averaging based on the peak level.

Subsequently, display range setting is executed (step S16).

The range, having its center at the detected position of the connecting point (or the other end), is set to 10 m/div, and the waveform is displayed.

If the maximum value detected position (Pposi) falls outside the display range of 2–8 div, the display range is shifted to shift the abscissa scale so that Pposi is located at 2 div or 8 div of the display range.

Then, execution of capture of the waveform is executed (step S17), thereafter switch of the wavelength is executed (step S18), and the processes of the steps S15 and the subsequent steps are repeatedly executed.

Next, the peak detection is executed (step S19).

In this step, the measurement data of the position of the connecting point is subjected to fitting with a quadratic function curve, thereby interpolating data between the points at which the measurement data are substantially obtained, so that the physical resolution can be improved.

In other words, the processing means 8 subjects the captured measurement data to fitting with a quadratic function curve to obtain the position of the connecting point based on the peak position, with the result that the wavelength dispersion values of the optical fibers are respectively calculated.

More specifically, the peak position of the waveform of a range ±200 m, having its center at the detected position of the connecting point, is redetected.

Log data (data of 3 dB less than the peak or less is excluded from the calculation) of a range determined by the pulse width, having its center at the peak position, is subjected to fitting with a quadratic function.

The peak of the quadratic function is determined to be the position of the connecting point.

Details of Processes (1) Redetection of Peak Position

The maximum value of the log data of within a range of ±20000 resolution (cm) (point), having its center at the detected position of the connecting point, is sought out. The position of the maximum value is determined to be Peak (if there are a plurality of data for maximum values, the point nearest to the detected position of the far end is determined to be Peak).

The value of the log data at Peak is determined to be Logd (Peak).

(2) Fitting

Range of Fitting

The maximum value of "i", which satisfies the condition Logd(Peak)−1500>Logd(i), is sought out from the Log data on the side of the near end from Peak, and Fstrt=i+1 is calculated (if there is no "i" which satisfies the condition, it is determined that the peak detection is impossible and the flow advances to (4)).

Likewise, the minimum value of "i", which satisfies the condition Logd(Peak)−1500>Logd(i), is sought out from the Log data on the side of the far end from Peak, and Fstrt=i−1 is calculated (if there is no "i" which satisfies the condition, it is determined that the peak detection is impossible and the flow advances to the process of (3)) where Fstrt represents the start point of fitting.

Fitting

In the pulse width of 10 ns to 20 $\mu$s, the fitting function (the quadratic function: y=ax^2+bx+c) is as follows:

Variables: a is a quadratic term of the fitting function, b is a linear term of the fitting function, a6 is $\epsilon$Logd (i), a7 is $\epsilon$(Logd(i)·x), a8 is $\epsilon$E(Logd(i)·x^2), n is the number of data points used in the fitting, n=Fstp−Fstrt+1 (if n≤2, it is determined that the peak detection is impossible and the flow advances to (3)).

In the case where i=Fstrt~Fstp (where Fstp corresponds to the end point for fitting), a6=a6+Logd(i), a7=a7+Logd(i)*j, a8=a8+Logd(i)*j*j, i=i+1, j=j+1.

The above operation is repeated.

$A=\{(n+1)*(n+2)/6*a6-(n+1)*a7+a8\}/\{n*(n+1)*(n-2)*(n+2)*(n-1)/180\}$ $B=\{12*a7-6*(n+1)*a6\}/\{n*(n+1)*(n-1)\}-(n+1)*A$.

Peak Detection

The detected position Posi(n) (n: wavelength number) is obtained by Posi(n)=(−B/(2*A)−1+Fstrt)* Resolution (cm)+ Sampling Start Position (cm) (calculated to the unit of 1 cm).

(3) The processes (1), (2) and (3) are repeated with respect to each wavelength.

(4) The approximate expression of the dispersion measurement is obtained from Posi(n).

At a marker position, the value of Posi(n) (an IOR-converted value) is displayed.

Approximate expression of the quadratic equation by the least-squares method

To approximate the m-number of data with y=ax$\lambda$2+bx+c by the least square method, three normal equations are required.

The first is obtained by multiplying the coefficient c (=1) in the respective equations of the conditions, and adding them together.

$\epsilon(y)=\epsilon(x^2)\times a+\epsilon(x)\times b+\epsilon(c)$.

The second normal equation is obtained by multiplying the above equation by the coefficient of b (=x).

$\epsilon(y\times x)=\epsilon(x^3)\times a+\epsilon(x^2)\times b+\epsilon(c\times x)$.

Likewise, the third normal equation is obtained by multiplying the above equation by the coefficient of a (=x^2).

$\epsilon(y\times x^2)=\epsilon(x^4)\times a+\epsilon(x^3)\times b+\epsilon(c\times x^2)$.

The approximate expression by the least-squares method is obtained by the above three equations.

Then, resetting of the display range is executed (step S20).

Outline of Process

After the peak detection, the display range is reset so that the peak waveform of each wavelength can be displayed within the screen.

The abscissa scale is determined on the basis of the maximum and minimum values at the peak position of each wavelength (at least 10 m/div).

The abscissa shift position is determined such that the peak waveforms at all wavelengths are within the display range of 2–8 div.

Detailed Explanation

If the difference between the maximum and minimum values of the peak position at each wavelength is 80 m or more (in the case where the IOR of each wavelength is 1.5), the abscissa scale, which satisfies the condition: the abscissa scale×0.8≧(the difference between the maximum and minimum values of the peak position), is selected.

As regards the abscissa shift, the abscissa shift position is changed such that the intermediate value between the maximum and minimum values of the peak position is located at the center of the screen.

As described above in detail, according to the present invention, the wavelength dispersion measuring apparatus for obtaining the wavelength dispersion characteristic of the optical fiber to be measured is placed at an end of the optical fiber to be measured so that the dispersion can be measured from the one end of the optical fiber to be measured. In addition, measurement light of a plurality of wavelengths is emitted to the optical fiber to be measured, and the wavelength dispersion value of the fiber to be measured is calculated by approximating the wavelength characteristic of a delay time based on delay times of reflected lights of the respective wavelengths. Since this structure is simple, the operation can be easy.

Further, according to the present invention, the wavelength of the measurement light is varied and measurement is carried out a plurality of times. Therefore, the approximation of the wavelength characteristic can be obtained accurately.

In particular, according to the present invention, if the apparatus has a structure for emitting light of the wavelength corresponding to the minimum value of the dispersion for the kind of the laid optical fiber to be measured and lights of at least two wavelengths different from the above wavelength, the wavelength dispersion value corresponding to the kind of the optical fiber to be measured can be obtained more accurately.

For example, using a structure for emitting lights of the wavelengths 1.31 $\mu$m, 1.55 $\mu$m and 1.625 $\mu$m for the kinds of the optical fibers for general-purpose use, a:more accurate wavelength dispersion value can be obtained.

The above wavelength dispersion value can also be obtained by utilizing the basic structure of a general-purpose OTDR. In this case, the search of a defective point of the optical fiber to be measured, the measurement of an optical loss, etc., and the measurement of the wavelength dispersion characteristic can be carried out by one OTDR without re-connection.

Further, according to the wavelength dispersion measurement method and a storage medium storing the wavelength dispersion processing program, the wavelength dispersion value of the optical fiber to be measured can be obtained by a simple process and only at one end of the optical fiber to be measured.

Furthermore, with the storage medium storing the wavelength dispersion processing program of the present invention, the positions of the connecting points of the optical fibers laid in the execution process are obtained, thereby obtaining an approximate expression of the wavelength characteristic of a delay time. As a result, in an actual circuit in which a plurality of optical fibers are connected, the dispersion of each optical fiber can be measured easily from one end of the optical fiber.

What is claimed is:

1. An apparatus for measuring wavelength dispersion for each of a plurality of optical fibers that are connected in series by at least one connecting point and form a to-be-measured optical fiber, said apparatus comprising:

a light source for emitting optical pulses of a plurality of wavelengths;

branching means for transmitting the optical pulses emitted from the light source to one end of the to-be-measured optical fiber and extracting reflected light from the optical fiber;

light receiving means for detecting the reflected light from the branching means and outputting the reflected light as measurement data; and processing means for calculating a wavelength dispersion value of the optical fiber to be measured, by detecting a time of emitting the optical pulse of each of said plurality of wavelengths from the light source and a time of receiving the reflected light of the wavelength by the light receiving means, wherein the processing means calculates wavelength dispersion values of the respective optical fibers by detecting the time of emitting the optical pulse, the time of receiving the corresponding reflected light from the connecting point and a time of receiving the corresponding reflected light from another end of the optical fiber.

2. A wavelength dispersion measuring apparatus according to claim 1, wherein the processing means subjects the measurement data output from the light receiving means to fitting with a quadratic function curve to detect the time of receiving the reflected light from the connecting point, thereby calculating the wavelength dispersion values of the respective optical fibers.

3. A wavelength dispersion measuring apparatus according to claim 1, wherein the light receiving means comprises a light receiving element for outputting a detection signal of a value corresponding to a level of the reflected light and an analog to digital (A/D) converter for A/D converting the detection signal of the light receiving element.

4. A wavelength dispersion measuring apparatus according to claim 3, wherein said wavelength dispersion measuring apparatus executes wavelength dispersion measurement with an optical time domain reflectometer including said light source, said branching means, said light receiving means and said processing means, and connected to one end of a plurality of optical fibers that forms a to-be-measured optical fiber, for emitting a measurement light into the to-be-measured optical fiber and detecting an optical loss and a defective point of the optical fiber based on a status of a reflected light, said processing means first approximates a wavelength characteristic in a delay time from a delay time of reflected lights of the respective wavelengths based on a time of emitting measurement lights of the respective wavelengths from the light source and a time of receiving the reflected lights detected by the light receiving element and thereafter calculates a wavelength dispersion value of the optical fiber based on the approximation in accordance with an output from said A/D converter.

5. A wavelength dispersion measuring apparatus according to claim 4, wherein said processing means subjects the measurement data output from the light receiving means to fitting with a quadratic function curve to detect the time of receiving the reflected light from the connecting point, thereby calculating the wavelength dispersion values of the respective optical fibers.

6. A wavelength dispersion measuring apparatus according to claim 1, wherein the light source is a variable-wavelength light source by which the wavelength is variable within a predetermined range having a center at a reference wavelength.

7. A wavelength dispersion measuring apparatus according to claim 1, wherein the light source comprises a plurality of light emitting elements for emitting a light of a wavelength corresponding to a minimum value of dispersion in accordance with a kind of the optical fiber to be measured and lights of at least two wavelengths different from said wavelength.

8. A wavelength dispersion measuring apparatus according to claim 1, wherein the light source comprises a light emitting element for emitting a light having a wavelength of 1.31 $\mu$m, a light emitting element for emitting light having a wavelength of 1.55 $\mu$m and a light emitting element for emitting a light having a wavelength of 1.625 $\mu$m.

9. A method for measuring wavelength dispersion for each of a plurality of optical fibers that are connected in series by at least one connecting point and form a to-be-measured optical fiber, said method comprising the steps of:

emitting optical pulses of a plurality of wavelengths;

transmitting the optical pulses to one end of the to-be-measured optical fiber and extracting reflected light from the optical fiber, detecting the reflected light and outputting the reflected light as measurement data, and calculating a wavelength dispersion value of the optical fiber to-be-measured, by detecting a time of emitting the optical pulse of each of said plurality of wavelengths and a time of receiving the reflected light of the wavelength, wherein the calculating step calculates wavelength dispersion values of the respective optical fibers by detecting the time of emitting the optical pulse, the time of receiving the corresponding reflected light from the connecting point and a time of receiving the corresponding reflected light from another end of the optical fiber.

10. A measuring wavelength dispersion method according to claim 9, wherein measurement lights of a plurality of wavelengths are input Through one end of the optical fiber for obtaining a wavelength dispersion value of said plurality of optical fibers, and a wavelength dispersion value of the optical fiber is obtained based on a difference in delay time between reflected lights of the respective wavelengths returned from the optical fiber, and when wavelength dispersion values of the respective optical fibers are calculated by detecting a time of emitting an optical pulse, a time of receiving the corresponding reflected light: from the connecting point, a time of receiving the corresponding reflected light from the connecting point, and a time of receiving the reflected light from another end of the optical fiber to be measured, the measurement data being subjected to fitting with a quadratic function curve to detect the time of receiving the reflected light from the connecting point, thereby calculating the wavelength dispersion values of the respective optical fibers.

11. A measuring wavelength dispersion method according to claim 9, wherein measurement lights of a plurality of wavelengths are input through one end of the optical fiber for obtaining an approximate expression of a wavelength characteristic in delay time based on a difference in delay time between reflected light of the respective wavelengths returned from the optical fiber, and wavelength dispersion values of the respective optical fibers are calculated based on the approximate expression by detecting a time of emitting an optical pulse, a time of receiving the corresponding reflected light from the connecting point, a time of receiving the corresponding reflected light from the connecting point, and a time of receiving the reflected light from another end of the optical fiber to be measured.

12. A measuring wavelength dispersion method according to claim 9, wherein measurement lights of a plurality of wavelengths are input through one end of the optical fiber for obtaining a wavelength dispersion value of said plurality of optical fibers, and an approximate expression of wavelength characteristic in delay time is obtained based on a difference in delay time between reflected lights of the respective wavelengths returned from the optical fiber and the wavelength dispersion value of the optical fiber is obtained based on the obtained approximate expression, and when wavelength dispersion values of the respective optical fibers are calculated by detecting a time of emitting an optical pulse, a time of receiving the corresponding reflected light from the connecting point, and a time of receiving the reflected light from another end of the optical fiber to be measured, the measurement data is subjected to fitting with a quadratic function curve to detect the time of receiving the reflected light from the connecting point, thereby calculating the wavelength dispersion values of the respective optical fibers.

13. A computer-readable storage medium storing a program for measuring wavelength dispersion for each of a plurality of optical fibers that are connected in series by at least one connecting point and form a to-be-measured optical fiber, said program comprising the steps of:

emitting optical pulses of a plurality of wavelengths;

transmitting the optical pulses to one end of the to-be-measured optical fiber and extracting reflected light from the optical fiber;

detecting the reflected light and outputting the reflected light as measurement data, and calculating a wavelength dispersion value of the optical fiber to-be-measured, by detecting a time of emitting the optical pulse of each of said plurality of wavelengths and a time of receiving the reflected light of the wavelength, wherein the calculating step calculates wavelength dispersion values of the respective optical fibers by detecting the time of emitting the optical pulse, the time of receiving the corresponding reflected light from the connecting point and a time of receiving the corresponding reflected light from another end of the optical fiber.

14. A computer-readable storage medium according to claim 13, wherein said program includes a step in which measurement lights of a plurality of wavelengths are input through one end of the optical fiber for obtaining a wavelength dispersion value of said plurality of optical fibers, and a wavelength dispersion value of the optical fiber is obtained based on a difference in delay time between reflected lights of the respective wavelengths returned from the optical fiber, and when wavelength dispersion values of the respective optical fibers are calculated by detecting a time of emitting an optical pulse, a time of receiving the corresponding reflected light from the connecting point, a time of receiving the corresponding reflected light from the connecting point, and a time of receiving the reflected light from another end of the optical fiber to be measured, the measurement data is subjected to fitting with a quadratic function curve to detect the time of receiving the reflected light from the connecting point, thereby calculating the wavelength dispersion values of the respective optical fibers.

15. A computer-readable storage medium according to claim 13, wherein said program includes a step in which measurement lights of a plurality of wavelengths are input through one end of the optical fiber for obtaining an approximate expression of a wavelength characteristic in delay time based on a difference in delay time between reflected lights of the respective wavelengths returned from the optical fiber, and wavelength dispersion values of the respective optical fibers are calculated based on the approximate expression by detecting a time of emitting an optical pulse, a time of receiving the corresponding reflected light from the connecting point, a time of receiving the corresponding reflected light from the connecting point, and a time of receiving the reflected light from another end of the optical fiber to be measured.

16. A computer-readable storage medium according to claim 13, wherein said program includes the step in which measurement lights of a plurality of wavelengths are input through one end of the optical fiber for obtaining a wavelength dispersion value of said plurality of optical fibers, and an approximate expression of wavelength characteristics in delay time is obtained based on a difference in delay time between reflected lights of the respective wavelengths returned from the optical fiber, and the wavelength dispersion value of the optical fiber is obtained based on the obtained approximate expression, and when wavelength dispersion values of the respective optical fibers are calculated by detecting a time of emitting an optical pulse, a time of receiving the corresponding reflected light from the connecting point, a time of receiving the corresponding reflected light from the connecting point, and a time of receiving the reflected light from another end of the optical fiber to be measured, the measurement data is subjected to fitting with a quadratic function curve to detect the time of receiving the reflected light from the connecting point, thereby calculating the wavelength dispersion values of the respective optical fibers.

* * * * *